United States Patent [19]

Grundy

[11] Patent Number: 4,960,647

[45] Date of Patent: Oct. 2, 1990

[54] PROCESS FOR THE REACTIVE TREATING OF PALLADIUM TO FORM A PROTECTIVE COATING AND ARTICLE

[75] Inventor: James Grundy, San Diego, Calif.

[73] Assignee: Johnson Matthey Inc., Valley Forge, Pa.

[21] Appl. No.: 360,841

[22] Filed: May 22, 1989

[51] Int. Cl.$^5$ .............................................. C23C 22/05
[52] U.S. Cl. .................................. 428/472.1; 428/620; 148/279; 148/284; 106/1.27; 106/14.21
[58] Field of Search ............................ 106/14.21, 1.27; 148/240, 279, 284; 428/472.1, 472.2, 472.3, 620

[56] References Cited

U.S. PATENT DOCUMENTS 2,774,688 12/1956 Girard .................................. 106/1.27
3,154,478 10/1964 Lee ...................................... 106/1.27

*Primary Examiner*—Jay H. Woo
*Assistant Examiner*—Jeremiah F. Durkin, II
*Attorney, Agent, or Firm*—Cushman, Darby & Cushman

[57] ABSTRACT

Palladium metal or a palladium alloy which has been treated with boric acid so as to have a ceramic surface which is less susceptible to oxidation.

6 Claims, No Drawings

PROCESS FOR THE REACTIVE TREATING OF PALLADIUM TO FORM A PROTECTIVE COATING AND ARTICLE

The present invention relates to the treatment of palladium metal or palladium alloys, particularly palladium-silver alloys, to restrict the oxidation thereof.

When using palladium or palladium alloys in preparing a capacitor, the metal in the form of a paste is laid down between two dielectric layers. The resulting sandwich is then passed through an oven using a heating cycle which runs up to a temperature of up to 1000° C. or above. Typically, the heating cycle involves a temperature increase of about 25° C. per minute. Normally, palladium or alloys thereof start to oxidize at about 220°-230° and are usually wholly oxidized at 450°-500° C. However, at around 700° C. there is a substantial release of oxygen from the metal. The oxygen takeup and release during the heating cycle present processing difficulties which, although not insurmountable, require special care and attention, for example, a slow heat-up time. For example, the oxygen release at 700° C., if substantial, can cause voids or cracks and even disintegration of the assembly.

SUMMARY OF THE INVENTION

The invention is based on the finding that by treating palladium or palladium-silver alloys with boric acid, a ceramic-type surface is formed which shows a reduce tendency to oxidation. This characteristic is particularly advantageous in the case of palladium-silver alloys where alloy oxidation is especially undesirable.

The acid-treated metal of the invention demonstrates substantially reduced or delayed oxidation to the point where, for example, oxidation may not begin until much later in the processing cycle at significantly higher temperatures, generally at temperatures equal to or above the temperature where the untreated metal would normally be fully oxidized. The oxidation which results during the heating cycle is also greatly reduced using the acid-treated metal of the invention. As a consequence, the invention makes it possible to minimize or avoid the problems incident to oxidation in the preparation of capacitors using palladium alloys. It also becomes possible to increase the rate of heating and consequently reduce the processing time without damaging the capacitor assembly.

It has previously been known to add boric acid to a bath for plating nickel onto metals such as palladium in order to produce a lustrous, ductile and hard plate. See Girard, U.S. Pat. No. 2,774,688. It is also known to include boric acid in a nickel strike bath for immersing a resinous circuit board which has been activated with aqueous palladium chloride solution before the board is chemically plated with nickel. See Lee, U.S. Pat. No. 3,154,478. However, boric acid treatment of palladium or its alloys, particularly palladium-silver alloys, to provide an oxidation resistant surface is believed to be new.

DESCRIPTION OF PREFERRED EMBODIMENTS

While the invention may be used in the treatment of palladium metal itself, the invention is of particular utility with respect to palladium-silver alloys which are used in the capacitor field. The composition of such alloys can be widely varied. However, a preferred alloy composition comprises 30% by weight palladium and 70% by weight silver.

It is to be understood, however, that the oxidation resistance of any palladium-silver alloy or the like, which is subject to oxidation on being heated, may be improved according to the invention. Typical alloys include palladium-silver alloys comprising 10-95% palladium and 90-5% silver. Related alloys including up to 5-10% copper or the like are other illustrative examples.

The palladium or alloy thereof may be treated with boric acid, according to the invention, in a variety of ways. Advantageously, the palladium or alloy is processed in powder or particulate form, the powder preferably being added to an aqueous boric acid solution. The resulting slurry is advantageously stirred to be sure that the powder surface is thoroughly wetted after which the powder is subjected to a drying heat treatment.

The concentration of the boric acid solution may be varied. Usually the concentration will be in the range of 0.5-10% boric acid by weight, preferably about 1-2%, although concentrations outside these ranges may also be useful.

The acid treatment can be carried out at room temperature (20°-25° C.) although other temperatures, (for example, 50°-85° C. or higher) may be used.

Instead of slurrying the metal or alloy in acid solution, the acid may be sprayed onto the metal or alloy so as to thoroughly wet the surface. However, it is generally easier to slurry the powder in aqueous acid solution.

The duration of the acid treatment can be varied and will depend, at least to some extent, on the temperature employed. Usually, however, it is sufficient to simply be sure that all of the powder surfaces are wetted with the acid solution.

After being wetted with the boric acid, the powder is dried by heating in an oven or the equivalent at, for example, 75°-125° C. or higher. The duration of such heat treatment can be varied but should be sufficient to develop a ceramic-like surface which is highly resistant to oxidation. Normally a heating time of 2-5 hours is sufficient, although the optimum period will depend on other conditions, particularly, the temperature used. Preferred conditions include heating at 25°-150° C. for 4-5 hours.

It will be appreciated that the term "powder" as used herein is intended to refer to any type of metal particulate including fine or coarse powder, flake or the equivalent.

EXAMPLES

The invention is illustrated in the following Examples:

EXAMPLE 1

1.5 grams of boric acid are dissolved in 75 mls. of water. To this solution are added 150 grams of palladium-silver powder (30% Pt/70% Ag) so as to form a slurry with the powder thoroughly wetted with the acid solution. The resulting slurry is then placed in a drying oven and dried at 125° C. for 4 hours. Subsequent examination of the powder showed it to have a ceramic-like surface which was resistant to oxidation.

When subjected to a typical heat treatment cycle, as employed in the preparation of a capacitor, it was noted that the powder did not start to oxidize until about 460°

C. In contrast, the untreated powder was totally oxidized at this temperature. The boric acid treatment of the invention thus delays or minimizes oxidation of the alloy thereby improving the resulting capacitor processing assembly.

EXAMPLE 2

Example 1 was repeated except that the powder was dried by heating at 75° C. for about 4 hours with essentially the same results.

EXAMPLE 3

Example 1 was repeated except that only 0.75 grams of boric acid were used. The treatment gave an oxidation-resistant coating.

As noted, the acid treated metal of the invention is uniquely suitable for use in preparing capacitors. According to the usual practice, the metal in the form of a paste (using an inert liquid vehicle) is spread between two layers of dielectric and the resulting assembly is passed through an oven using a graduated heating cycle up to a temperature of, for example, 1000° C. Typically, the temperature is raised at a rate of, for example, 25° C./minute up to the final temperature. As noted earlier, a problem is encountered with palladium and its alloys in that at around 220°-230° C., the metal starts oxidizing, that is, collecting oxygen, and it is possible that this will severely damage or destroy the assembly, particularly if the temperature is increased rapidly. At about 450°-500° C., the metal starts giving up its oxygen and at 700° C., most of the oxygen is released, after which the metal can be heated to the required higher temperatures without an oxidation problem. However, care needs to be taken as the oxygen is released, that this be done gradually to avoid cracking or disintegration of the assembly. The acid-treated metal of the invention is useful in minimizing or avoiding this problem because it retards oxidation so that oxidation of the metal does not begin until, for example, 450° C. or thereabouts, and is substantially less throughout the heating cycle. This is highly desirable, and means that the production of a capacitor using the treated metal may be speeded up or otherwise greatly facilitated and improved.

Various modifications may be made in the invention as defined in the following claims wherein:

I claim:

1. Palladium metal or a palladium alloy the surface of which has been treated with boric acid by wetting the surface of the metal or alloy with an aqueous solution consisting essentially of boric acid and then heating the thus wetted metal or alloy until a ceramic-like surface is formed, said surface being less susceptible to oxidation than the metal or alloy surface before said treatment with boric acid.

2. Palladium metal or alloy thereof according to claim 1 comprising 30% palladium and 70% silver.

3. Palladium metal or alloy thereof according to claim 1, said metal or alloy being treated in powder form so as to provide the ceramic-like surface thereon.

4. The process which comprises wetting palladium metal or alloy thereof with an aqueous solution consisting essentially of boric acid and thereafter drying by heating the wet metal or alloy, the heating being continued until a ceramic surface which is less susceptible to oxidation is developed.

5. The process of claim 4, wherein the drying is accomplished by heating at a temperature of at least 75° C.

6. A capacitor comprising two dielectric layers with the metal or alloy of claim 1 between said layers.

* * * * *